(12) United States Patent
Tsampalis et al.

(10) Patent No.: US 9,125,036 B2
(45) Date of Patent: Sep. 1, 2015

(54) ACCESSORY WITH INTEGRATED DISPLAY CONTROLLED BY CONNECTED DEVICE

(75) Inventors: Ioannis Tsampalis, Warren, NJ (US); Michael Hardy, Warren, NJ (US); Saeed Saatchi, Middleton, NJ (US); Patrick Bucci, Morris Planes, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 869 days.

(21) Appl. No.: 13/301,111

(22) Filed: Nov. 21, 2011

(65) Prior Publication Data

US 2013/0130658 A1 May 23, 2013

(51) Int. Cl.
*H04W 4/18* (2009.01)
*H04W 4/20* (2009.01)

(52) U.S. Cl.
CPC ............ *H04W 4/18* (2013.01); *H04W 4/206* (2013.01)

(58) Field of Classification Search
CPC ............................. H04W 4/18; H04W 4/206
USPC ............. 455/414.1–414.2, 418–420, 550.1, 455/556.2; 709/217
See application file for complete search history.

(56) References Cited

U.S. PATENT DOCUMENTS

| 2006/0062363 A1* | 3/2006 | Albrett ................ 379/101.01 |
| 2007/0054679 A1* | 3/2007 | Cho et al. ................ 455/466 |
| 2010/0137028 A1* | 6/2010 | Farris et al. ................ 455/557 |
| 2010/0285818 A1* | 11/2010 | Crawford ................ 455/456.3 |

OTHER PUBLICATIONS

Features and Specifications—Samsung Continuum i400 Android Smartphone, Samsung Mobile, http://www.samsung.com/us/mobile/cell-phones, Jul. 20, 2011, 4 pages.
Samsung Continuum i400 Android Smartphone, Samsung Mobile, http://www.samsung.com/us/mobile/cell-phones, Jul. 20, 2011, 3 pages.

* cited by examiner

*Primary Examiner* — Babar Sarwar (57) ABSTRACT

An accessory and method for displaying a data feed are described. A device interface of the accessory is configured to connect a processor with an external device and transfer a data feed from the external device to a display of the accessory. A memory stores computer executable instructions to instruct the processor to receive the transferred data feed via the device interface and to instruct the processor to provide the transferred data feed to the display. A user interface provides a user input in response to the transferred data feed to the processor and back to the external device.

22 Claims, 6 Drawing Sheets

*Bill: I'm having lunch at The Grill--my fav* **CNN® breaking news alert *Mary To Play in Tourney *TennisI Score Aler...

ACCESSORY WITH INTEGRATED DISPLAY CONTROLLED BY CONNECTED DEVICE

BACKGROUND

The present accessory generally relates to an apparatus for use with a cellular device and, in particular, an apparatus connected to a cellular device for providing a ticker tape type of display of one or more data feeds received by the cellular device from a cellular network.

BRIEF DESCRIPTION OF THE DRAWINGS

Corresponding reference characters indicate corresponding parts throughout the drawings.

DETAILED DESCRIPTION

With the continued popularity of social networking sites, more and more users are participating in more and more interactive communication. In many cases, the users rely on cellular phones or other handheld devices to stay in contact with their social media accounts. During certain times of the day or night, when social networking sites are presenting many entries in succession in a short period of time, users are challenged to keep up with the many communications which are presented on their phones on each of the sites and, at the same time, perform other tasks and activities.

Users desire alternatives which allow the user to simultaneously monitor several social media accounts without directly accessing their phone. A display separate from the cellular phone display which presents to the user up-to-date feeds from two or more of the user's social media accounts gives the user the ability to monitor these accounts and, at the same time, perform other tasks and activities.

Users also desire a ticker tape type of display which allows the user to quickly interact with multiple accounts. Many handheld units have a relatively small touch screen display which requires the user's full attention and limits the user's ability to interact with other devices and to perform other tasks and activities. Many users prefer to respond and provide concurrent input to several of their accounts without having to switch back and forth between screens or applications.

Users also desire alternatives which allow them to multitask at the same time. In addition to monitoring and interacting with their accounts, many users also are involved in other coincident tasks and activities, such as games which may require users to use a keyboard or a mouse. From time to time, a user may want to view multiple real and non-real time feeds available via the user's cellular device on a separate, ticker tape type of display rather than on the cellular device itself. Thus, a user may desire a ticker tape display of on-going feeds which does not require users to hold a cellular device and which allows users to monitor feeds while having hands-free.

Figure 1:
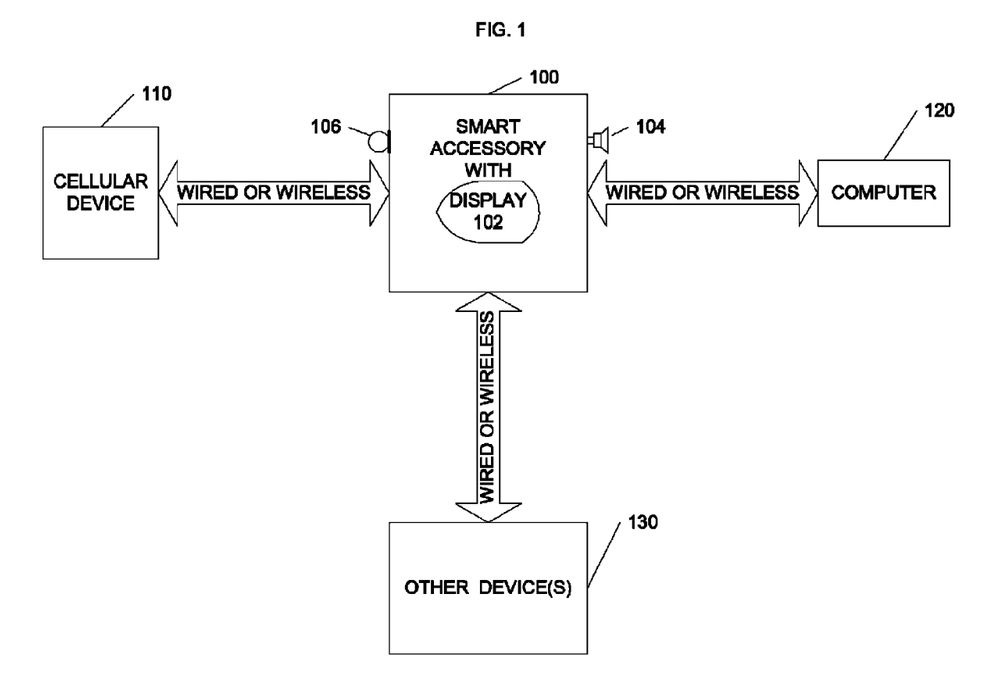
FIG. 1 is a block diagram of a smart accessory with display according to one embodiment in combination with a cellular device, a computer and other devices.

As illustrated in FIG. 1, a smart accessory 100 with display 102 for use with and linked to one or more external, connected devices is shown. Examples of the external devices that may be associated with and docked to the accessory 100 include: a cellular device 110, a computer 120 and/or other electronic devices 130 (e.g., an iPod® device or an iPod Touch® device). Each of the devices associated with the accessory 100 is capable of receiving a data feed from a cellular network and/or from some other wireless network such as a WiFi network, and/or from a wired network such as the Internet. In general, a data feed is a stream of data from one or more data sources. A data feed includes any data stream, which is a sequence of digitally encoded coherent signals (e.g., packets of data or data packets) used to transmit or receive information. Examples of data feeds include Facebook® updates, Twitter® messages, new notifications of incoming emails, calendar invites, instant messaging, incoming calls, advertisements, coupons, etc.

When linked, the accessory 100 receives the data feeds from its associated devices and displays a corresponding data feed on the display 102 of the accessory 100. In one example, the accessory 100 may include a docking station in which the cellular device 110 is able to be retained. In other examples the accessory 100 may be a device other than a docking station. For example, once the accessory 100 is linked to the cellular device 110, such as a cellular phone, then the display 102 of the accessory 100 can display various data feeds. As another example, once the accessory 100 is linked to the computer 120, such as a desktop, tablet or laptop, then the display 102 of the accessory can display various data feeds.

The display of data feeds by the accessory 100 may be referred to as a "tickertape" feature. The accessory 100 may be linked to multiple devices, in which case multiple data feeds are able to be essentially simultaneously displayed, such as by multiplexing processing and/or display of the data feeds. As used herein, linking includes but is not limited to a hard-wired connection, such as via a cable or docking station, or a short or long range wireless connection, such as via RF, WiFi, ZigBee™, Bluetooth® or infrared transmissions.

Optionally, the accessory 100 may include a speaker 104 for providing audible information, such as a vocalization of the data feed, or an audible alert to a user that an update, message, notification or other data feed has been received by the accessory 100 and displayed on its display 102. Optionally, the accessory 100 may include a microphone 106 for receiving voice commands from the user. The accessory 100 may perform certain actions in response to the voice commands or the accessory 100 may convert a voice command to a command sent to the linked device 100 for action by the application on the linked device 100 providing the data feed.

Figure 2:
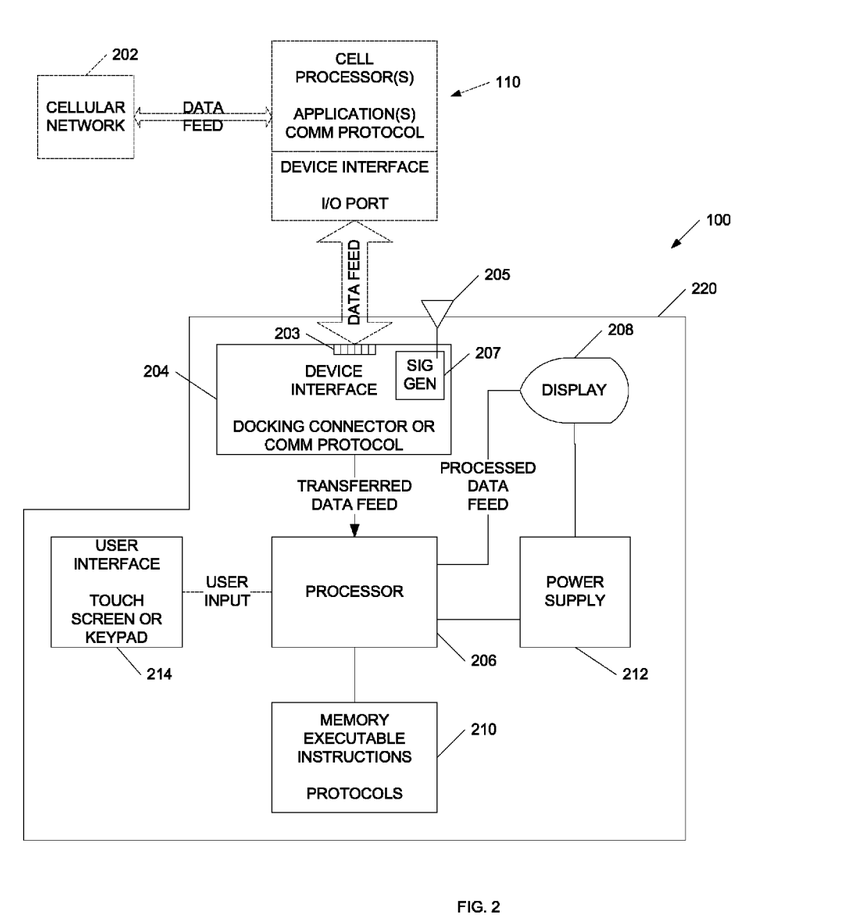
FIG. 2 is a block diagram of a smart accessory with display according to one embodiment in combination with a cellular device.

As shown in FIG. 2, the accessory 100 may be used, in one embodiment, with a cellular device 110. The device 110 includes an application executed by the device 110. The application is configured to receive a data feed via a network, such as a cellular network 202 or another wireless network such as a WiFi network communicating with the device 110. A device interface 204 connects to a processor 206 of the accessory 100 communicating with the cellular device 110 and transfers the data feed from the cellular device 110 to the processor 206. The device interface 204 links with the cellular device 110 in order to implement the transfer of the data feed.

If the device interface 204 is a wireless interface, such as a Bluetooth® communications protocol, the device interface comprises an antenna 205 and a signal generator 207 for transmitting and receiving signals from the cellular device 110. The device interface 204 may include a processor (not shown) for controlling the signal generator 207 or a software application executed by the processor 206 may control the signal generator 207.

Alternatively or in addition, the device interface 204 may be a male docking connector 203 that directly engages the cellular device 110. In this embodiment, an I/O port of the cellular device 110 is configured to be plugged directly into the docking connector 203.

Depending on the type of device interface, the transferred data feed received by the device interface 204 may be transformed by the device interface 204 before being provided to the processor 206. For example, if the device interface 204 is a docking connector 203, it passes the transferred data feed from the cellular device 110 to the processor 206 without transforming the data feed or its format. It is also contemplated that a cable (not shown) may be the device interface 203 for connecting the accessory to the cellular device 110. As another example, if the device interface 204 is a wireless communications protocol and the processor 206 is configured to receive the data feed in a different data transfer protocol, the transferred data feed is transformed by the device interface 204 in order to be compatible with a data transfer protocol of the processor 206. If a wireless protocol is used, the accessory may have a cradle (not shown) to hold the cellular device 110.

A display 208 connected to the processor 206 and responsive to the processor 206 displays the transferred data feed which has been processed by the processor 206 in order to be displayed by the display 208. A memory 210 connected to the processor 206 stores computer executable instructions for instructing the processor 206 to receive the transferred data feed, for instructing the processor 206 to process the transferred data feed and for providing instructions to display the processed data feed on the display 208. The processor 206 is configured to execute the computer executable instructions stored in the memory 210. The memory 210 comprises a non-transitory, tangible, computer readable media such as RAM or ROM. A power supply 212 provides power to the processor 206 and the display 208. The power supply 212 may be a battery and/or a component for connection to a power source, such as a powered USB port which may also serve as the device interface 204. Optionally, the device 110 connected to the accessory 100 may recharge its battery when the accessory 100 is connected to an external power source.

The accessory also includes a user interface 214 for connection to the processor 206 for providing user input to the processor 206. The user interface 214 may communicate with the processor 206 via a wired or wireless connection and may include one or more of the following: a touch screen, a keypad, a keyboard, a microphone, a motion sensor or other user responsive device for providing information to the processor 206. In some embodiments, the user interface 214 may be part of the display 208 (the two are combined into one device), such as a touch screen which both displays information and receives user input.

In one embodiment, the accessory 100 contains a docking station including a housing 220 forming a unitary enclosure. The processor 206, the device interface 204, the display 208, the memory 210, the user interface 214 and the power supply 212 are enclosed within the housing as integral components. This embodiment forms a single, unitary package which allows the user to move and/or transport the docking station to various locations. The display 208 may be a touch screen for displaying the data feed and for receiving user input and forms part of one of the walls of the housing.

As an example of use of the docking station 100, when the user links a cell phone 110 to the docking station 100 and touches an icon on the touch screen of the display 208 of the docking station, the docking station 100 sends a signal to the cell phone to begin the process of transferring a data feed from the cell phone 110 to the accessory 100. In response, the cell phone begins to execute or continues to execute a predetermined social media program that causes the cell phone to access a social media account of the user previously selected by the user. As a result, the cell phone receives a data feed via the cellular network 202 (or via a WiFi connection to the Internet). The received data feed is transferred to the processor 206 of the accessory from the cell phone 110 via the device interface 204 of the accessory. In response, the processor 206 of the docking station displays the received data feed of the social media program on its display 208.

Once the data feed is displayed on the display 208, the user may use the accessory 220 to interact with the displayed data feed. For example, the user may use a touch screen of the docking station to add a comment to the displayed entry of a data feed by touching an item of data (e.g., an entry by another) to select the entry. Next, the user would use a keypad of the interface 214 (or voice command) to compose a response to the entry. The composed response would be provided to the application being executed by the cell phone 110 for action by the application. Consider Facebook® as a specific example. If a user is monitoring a person's Facebook® wall and a comment (e.g., an entry) is posted on the wall, the user could select the comment, enter an additional comment using the keypad and post the additional comment on the person's Facebook® wall.

As another example, the user may use a touch screen to select and view a webpage link noted within a data feed by touching the webpage link on the touch screen. The accessory 220 would respond by instructing the application being executed by the cell phone 110 and providing the data feed to open the webpage link so that the webpage would be displayed on the display 208 of the accessory 220. Instead, if the accessory has direct access to the Internet (not illustrated), the accessory may use its access to the Internet to open the webpage link selected by a user. When the user responds with user input to an entry of a data feed, the user input is associated with particular data of the data feed. In some embodiments, the processor 206 receives the user input and in response provides the desired functionality associated with the input, such as adding a comment, opening a webpage link which has been selected, or sending a response which would be added to the data feed. In other embodiments, the processor 206 communicates the user input and the associated data to the cell processor of the cellular device 110 so that the application providing the data feed may respond. Depending on the application executing on the cell processor and delivered the data feed, the application may respond to the user input and associated data. As a specific example, if the data feed is a micro-blogging service such as Twitter®, the comment may be broadcast on Twitter® as connected to the associated data.

In one embodiment, the accessory 100 is configured to multiplex two or more data feeds from the same cellular device 110. For example, the cellular device 110 executes a second application receiving a second data feed via the cellular network. The device interface 204 transfers the second data feed from the cellular device 110 to the processor 206. The display 208 is responsive to the processor 206 for displaying the second transferred data feed. In this embodiment, the program stored in the memory 210 and executed by the processor 206 instructs the processor 206 to receive the transferred second data feed via the device interface 204 and further instructs the processor 206 to provide the transferred second data feed to the display 208. In one embodiment, both data feeds are being essentially simultaneously provided to the processor 206 via the device interface 204, the processor 206 multiplexes the data feeds by combining the data feeds for receipt, processing and display. The two data feeds may have different supported interface communications protocols.

In another embodiment, the accessory 100 is configured to multiplex two or more data feeds from two different cellular devices 110. For example, a second cellular device 110 executes a second application receiving a second data feed via the cellular network. The device interface 204 transfers the second data feed from the second cellular device 110 to the processor 206. The display 208 is responsive to the processor 206 for displaying the second transferred data feed. In this embodiment, the program stored in the memory 210 and executed by the processor 206 instructs the processor 206 to receive the transferred second data feed via the device interface 204 and further instructs the processor 206 to provide the transferred second data feed to the display 208. As above, in one embodiment both data feeds are being essentially simultaneously provided to the processor 206 via the device interface 204, the processor 206 multiplexes the data feeds by combining the data feeds for receipt, processing and display. The two data feeds may have different supported interface communications protocols. When two or more data feeds are being simultaneously displayed, the user may have various options as to how the feeds are presented on the display. For example, items from the feeds may be combined and displayed chronologically as received or separate windows on the display may present each feed.

Figure 3:
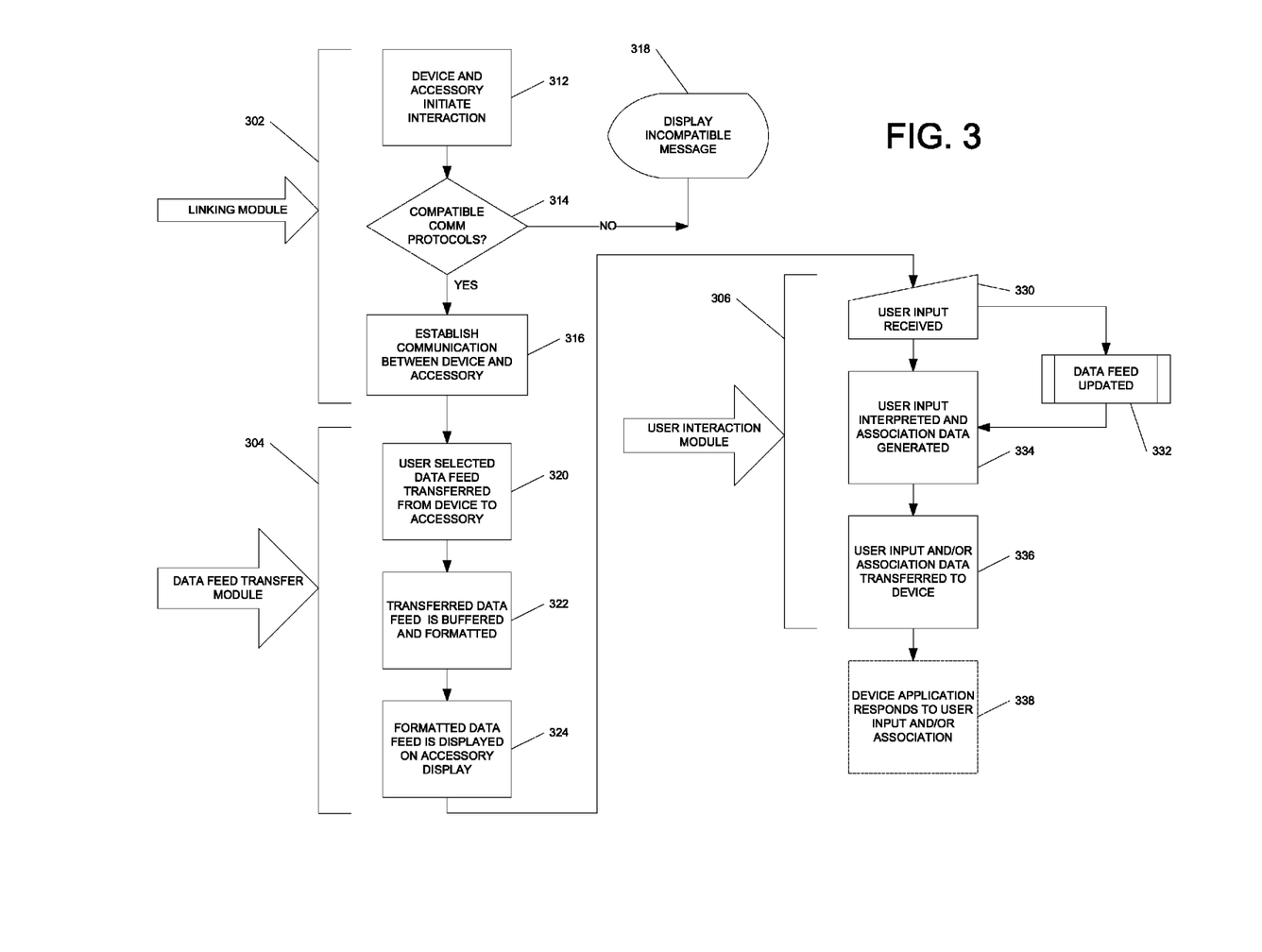
FIG. 3 is a flow diagram of computer executable instructions executed by the processor of the accessory according to one embodiment.

FIG. 3 is a flow diagram of computer executable instructions executed by the processor 206 of the accessory 100 according to one embodiment. In one form, the computer executable instructions stored in the memory 210 and executable by the processor 206 comprise a plurality of instruction modules. A linking module 302 of the computer executable instructions links the processor 206 and cellular device 110. A transfer module 304 of the computer executable instructions transfers a user selected data feed from the cellular device 110 to the processor 206 after the processor 206 has been linked to the cellular device 110 by the instruction module via the device interface 204. The user provides user input by interacting with the transferred data feed displayed on the display 208. An interaction module 306 of the computer executable instructions receives the user input provided by the user via the user interface 214 and provides the received user input to the application executed by the cellular device 110.

As part of the linking module instructions 302 illustrated in FIG. 3, at 312, the processor 206 executes instructions so that the cellular device 110 and the accessory 100 initiate interaction. In particular, the computer executable instructions stored in the memory 210 and executable by the processor 206 include instructions for sending a signal from the accessory 100 to the cellular device 110 to initiate the handshake process to determine a common, compatible communications protocol, e.g., Bluetooth® protocol or WiFi, used by both the accessory 100 and the cellular device 110 to communicate. In order to facilitate linking by the linking module 302 in order to permit the accessory 100 to be compatible with multiple cellular devices, a plurality of communications and data transfer protocols are stored in the memory 210. A compatible communications protocol is one of plurality of communications protocols that corresponds to a communications protocol supported by the cellular device 110 and the device interface 204. A compatible data transfer protocol is one of plurality of data protocols that is compatible with data protocols of the processor 206 (e.g., a parallel data protocol).

Via the interface 204, the processor 206 interacts of the cellular device 110 to identify a compatible communications protocol at 314. Once a compatible communications protocol is identified, instructions at 316 use the compatible communications protocol to establish a communication link between the processor 206 and the cellular device 110 via the interface 204. In the event that the accessory 100 is unable to detect a cellular device 110 by a wireless communication (e.g., WiFi, Bluetooth®) or via the docking connector 203, the display 208 may optionally indicate such by providing a message at 318, that the accessory 100 is not detecting any cellular devices 110. For example, the message may be "No devices detected. Turn ON Bluetooth® or Wifi of a cell to link it." In the event that the accessory 100 is able to detect a device but no compatible communications protocol is found, the display 208 may optionally indicate such by providing a message at 318, that the cellular device 110 is incompatible with the accessory 100. For example, the message may be "Detected device not compatible."

As part of the data feed transfer module instructions 304, the processor 206 executes at 320 instructions for transferring a user selected data feed from the cellular device 110 to the processor 206 via the interface 204. The user selects the data feed to be transferred in several different ways. For example, the user may select the data feed via the user interface 204 or via the application executed by the cellular device 110.

If the application is not being executed by a device 110 when the device is linked to the accessory 100, the processor 206 of the accessory 100 signals the device 110 to execute the application to establish an up-to-date data feed for transfer. After the data feed is transferred, the processor 206 at 322 executes instructions for translating the data such as by buffering and formatting the transferred data feed so that the various processing and transfer rates of the various devices are compatible and do not interfere with one another. At this point, the processor 206 at 324 executes instructions for displaying on the display 208 the buffered and formatted data feed.

As part of the user interaction module instructions 306, the processor 206 executes instructions at 330 for receiving user input received by the processor 206 from the user interface 214. At this point, the processor 206 may optionally update the data feed at 332 and, at 334-338, the processor 206 executes instructions for transferring the user input to the cellular device 110 via the interface 204. As a result, the application on the cellular device 110 responds to the transferred user input.

In particular, at 334, the processor 206 executes instructions for receiving the user input via the user interface 214 followed by instructions at 336 for generating association data associating the received user input with at least a portion of the transferred data feed. Next, the processor 206 executes at 338 instructions for transferring the user input and the association data to the cellular device 110 via the interface 204. As a result, the application on the cellular device 110 responds to the transferred user input and to the association data. In one embodiment, the application on the cellular device 110 may react to the user's input with new information displayed on the display 102 of the accessory 100 and/or on the display of the cellular device 110.

When the cellular device 110 connects to the smart accessory 100, the cellular device 110 "negotiates" with the smart accessory 100 about the information to be displayed. For example, it is contemplated that the user can identify the information that the cellular device 110 can share for display by the accessory 100 in an "accessory feeds application." The user may also identify the information that the accessory 100 will receive for display from the cellular device 110 in an "accessory feeds application." For example, the application executed by the cellular device 110 may present the user with options regarding information sharing. Similarly, the instructions executed by the processor 206 of the accessory 100 may present the user with options on the display 208 regarding information to be received. As another example, the user presented with a list of options to select (e.g., SMS messages, hotmail, Gmail™, calendar, CNN® Breaking News, Target® Deals, Facebook® updates, etc.). These options may include cellular device 110 native functions (e.g., SMS, calendar) as well as feeds from applications on the device 110 (e.g. CNN® app, Facebook® app, etc.) and can register with the "accessory feeds application" as another input source.

Figure 4:
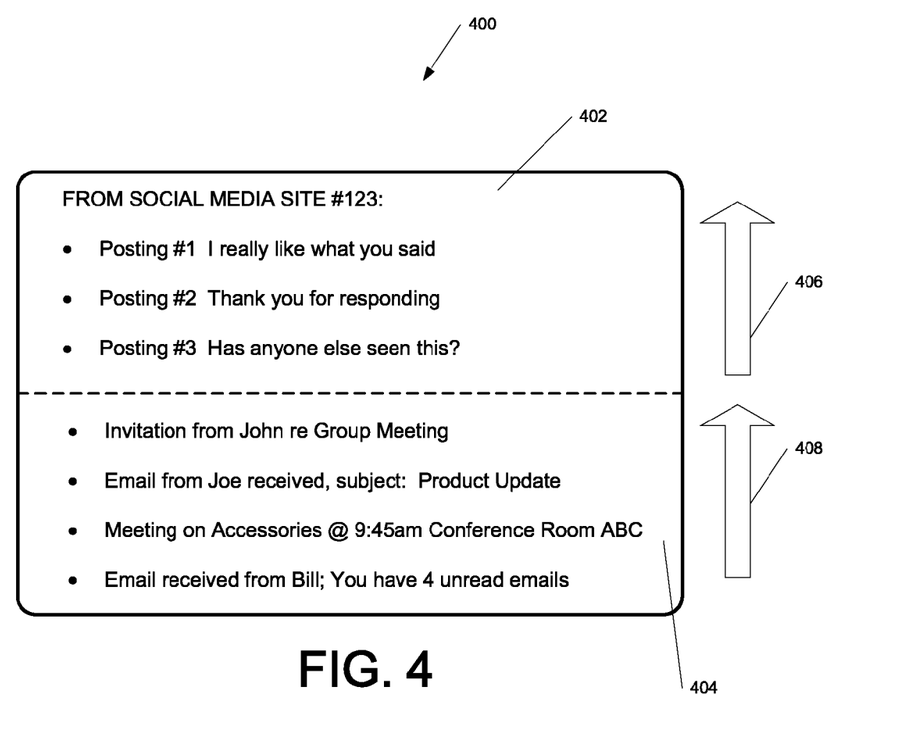
FIG. 4 illustrates an exemplary screen shot of a display in which the upper area presents one streaming media from source 123 and the lower area presents another streaming media from source 246.
Figure 5:
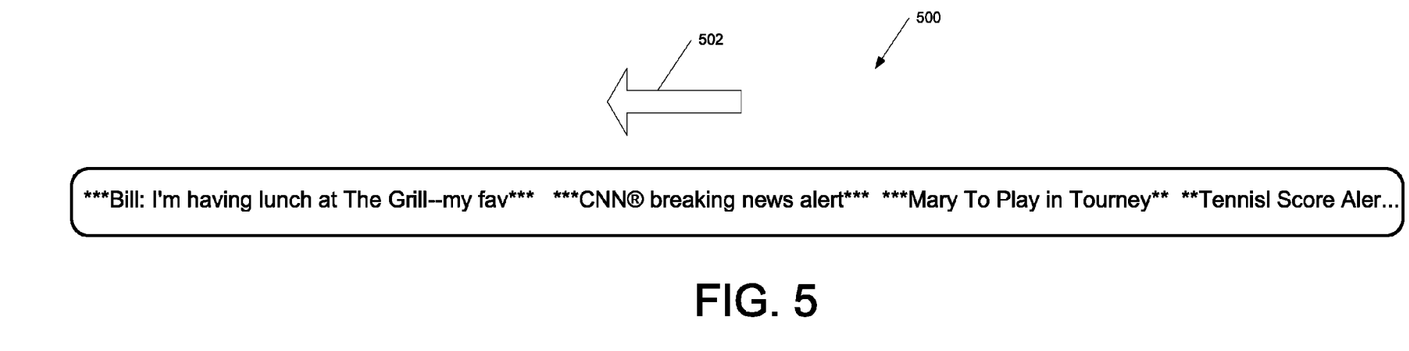
FIG. 5 illustrates an exemplary screen shot of a tickertape type display in which streaming media from a first source 123 is interlaced with streaming media from a second source 246.
Figure 6:
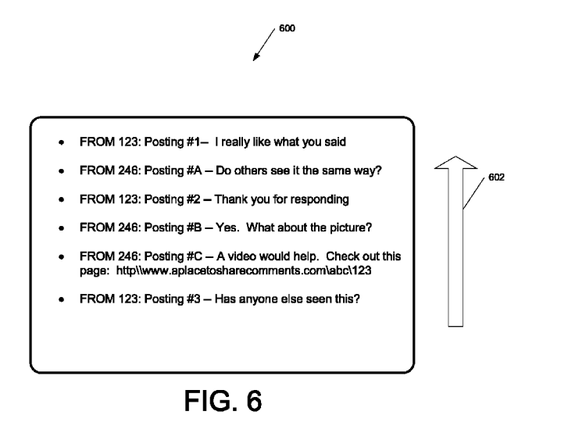
FIG. 6 illustrates an exemplary screen shot of a display in which one streaming media from source 123 is interlaced with another streaming media from source 246.

FIGS. 4-6 illustrates various examples of screen shots which may be used for presenting various data feeds on display 208, although it should be recognized that other alternatives and formats for presenting data feeds on display 208. Frequently, a screen shot would have a mix of incoming messages, from various sources including various message types. The screen shot may provide interactive messaging as well notifications, such as an appointment invitation (e.g., Invitation from John re Group Meeting), an email alert (e.g., email from Joe received, subject: Product Update), a calendar notification (e.g., Calendar: Meeting on Accessories @ 9:45 am Conference Room ABC). Alternatively, or in addition, the screen shot may include a Twitter® message (e.g., Bill: I'm having lunch at The Grill—my fav) or a news alert, (e.g. CNN® breaking news alert), or an RSS feed (e.g., "Mary To Play in Tourney" from ESPN®) or an alert from a website or application (e.g., "Baseball Score Alert" from ESPN®).

FIG. 4 illustrates an exemplary screen shot 400 presented on display 208 in which an upper area 402 presents one streaming media from a social media site #123 and a lower area 404 presents notifications from various sources. As additional entries from the subscribed streaming media feed from site #123 are received, each entry is added at the bottom of the area 402 and information in the area 402 is moved up, as indicated by the arrow 406, so that the bottom-most information presented in area 402 disappears. As additional entries from the subscribed streaming media feed from site #246 are received, each entry is added at the bottom of the area 404 and information in the area 404 is moved up, as indicated by the arrow 408, so that the bottom-most information presented in area 404 disappears.

FIG. 5 illustrates an exemplary screen shot 500 of a tickertape type presentation on display 208 in which various feeds from various sources are interlaced in a single, continuous stream which moves from right to left. As additional entries from subscribed streaming media feeds are received, each entry is added successively at the right of the display 208 and information on the display 208 is moved left, as indicated by the arrow 502, so that the left-most information disappears. This type of tickertape presentation may be one or more lines.

FIG. 6 illustrates an exemplary screen shot 600 presented on display 208 in which various streaming media feeds from various sources are interlaced with one another. As additional entries from subscribed streaming media feeds are received, each entry is added at the bottom of the display 208 and information on the display 208 is moved up, as indicated by arrow 602, so that the top-most information disappears.

Other aspects of the accessory 100 and/or cellular device 110 that may be displayed by the accessory 100 include battery levels, signal strength of signals being received and/or transmitted, calendar information, instant messages being received and/or transmitted, audio and/or video calls being received and/or transmitted such as Skype® calls and any other features selectable by the user.

If not connected to a device, the processor 206 of the accessory 100 may be configured to turn the accessory 100 OFF or display a clock, a digital time display, screen saver or other features or information (in active or standby modes). The user can configure the accessory 100 as desired.

The above description regarding FIGS. 2-3 relates to the cellular phone 110 linked to the accessory 100. It should be recognized that the following also applies to the computer 120 linked to the accessory 100 and/or multiple devices linked to the accessory. In one embodiment, the various protocols are defined in addition to (e.g., on top of) existing technologies supported by the devices connected to the accessory 100 in order to push the data feed to the accessory 100. Additionally, the various protocols may defined in addition to (e.g., on top of) other technologies supported by the accessory in order to pull the data feed from the connected devices.

Embodiments may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects may also be practiced in distributed computing environments where tasks are performed by remote processing devices that are linked through a communications network. In a distributed computing environment, program modules may be located in both local and remote computer storage media including memory storage devices.

In operation, computers, processors and/or servers may execute the computer-executable instructions such as those illustrated herein to implement aspects.

Embodiments may be implemented with computer-executable instructions. The computer-executable instructions may be organized into one or more computer-executable components or modules on a tangible computer readable storage medium. Aspects may be implemented with any number and organization of such components or modules. For example, aspects are not limited to the specific computer-executable instructions or the specific components or modules illustrated in the figures and described herein. Other embodiments may include different computer-executable instructions or components having more or less functionality than illustrated and described herein.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the systems, methods and apparatus described herein.

When introducing elements of aspects or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates by way of example and not by way of limitation. This description enables one to make and use, and describes several embodiments, adaptations, variations, alternatives and uses. Additionally, it is to be understood that the claims not limited in their application to the details of construction and the arrangement of components set forth in the following description or illustrated in the drawings. Other embodiments are contemplated and may be practiced or carried out in various ways. Also, it will be understood that the phraseology and terminology used herein is for the purpose of description and should not be regarded as limiting.

The Abstract and any summary are provided to help the reader quickly ascertain the nature of the technical disclosure. They are submitted with the understanding that they will not be used to interpret or limit the scope or meaning of the claims.

Having described various aspects in detail, it will be apparent that modifications and variations are possible without departing from the scope of various aspects as defined in the appended claims.

It is contemplated that various changes could be made in the above constructions, products, and methods without departing from the scope of various aspects. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus comprising:
   a processor;
   a device interface connected to the processor, said device interface configured to connect the processor with an external device and transfer a data feed, received by the external device from a network, from the external device to the processor;
   a display connected to the processor and responsive to the processor to display the transferred data feed;
   a memory connected to the processor and storing computer executable instructions to instruct the processor to receive the transferred data feed and to instruct the processor to provide the transferred data feed to the display, said processor configured to execute the instructions; and
   a user interface connected to the processor to provide user input to the processor;
   wherein the data feed includes a data stream that is a sequence of digitally encoded coherent signals; and
   wherein the computer executable instructions further instruct the processor to receive the user input, to generate association data associating the received user input with at least a portion of the transferred data feed, to transfer the user input and the association data to the external device via the device interface, whereby the external device updates the data feed in response to the transferred user input and to the association data, and to receive the updated data feed.

2. The apparatus of claim 1 wherein the computer executable instructions stored in the memory and executable by the processor comprise:
   a linking module to link the processor to a cellular device configured to connect with a cellular network;
   a transfer module to transfer a user selected data feed from the cellular device to the processor after the processor is linked to the cellular device by the instruction module; and
   an interaction module to receive user input provided by the user via the user interface, said received user input interacting with the transferred data feed displayed on the display, said interaction module further providing the received user input to an application executed by the cellular device.

3. The apparatus of claim 1 wherein a plurality of communications protocols are stored in the memory and wherein the computer executable instructions stored in the memory and executable by the processor comprise:
   instructions to determine via the interface a communications protocol of a cellular device configured to connect with a cellular network; and
   instructions to establish communication between the processor and the cellular device via the interface when one of plurality of communications protocols corresponds to a communications protocol of the cellular device.

4. The apparatus of claim 1 wherein the computer executable instructions stored in the memory and executable by the processor comprise:
   instructions to establish communication via the interface between the processor and a cellular device configured to connect with a cellular network;
   instructions to transfer a user selected data feed from the cellular device to the processor;
   instructions to buffer and format the transferred data feed; and
   instructions to display on the display the buffered and formatted data feed.

5. The apparatus of claim 4 wherein the computer executable instructions stored in the memory and executable by the processor comprise a computer readable medium having stored thereon:
   instructions to receive user input by the processor via the user interface; and
   instructions to transfer the user input to the cellular device via the interface, whereby an application on the cellular device responds to the transferred user input.

6. The apparatus of claim 1 wherein at least one of:
   the device interface comprises a docking connector;
   the device interface comprises a wireless communications protocol; and
   the user interface comprises a touch screen of the display.

7. The apparatus of claim 1 further comprising a housing forming a unitary enclosure, wherein the processor, the device interface, the display, the memory, and the user interface are within the housing as integral components.

8. The apparatus of claim 1:
   wherein the device interface is configured to connect with a cellular device which is configured to connect with a cellular network;

wherein the transferred data feed provided by the processor to the display comprises a transferred first data feed from a first application executed by the cellular device;

wherein the device interface transfers a second data feed from a second application executed by the cellular device and received via the cellular network, to the processor, said display responsive to the processor for displaying the transferred second data feed; and wherein the memory instructs the processor to receive the transferred second data feed via the device interface and instructs the processor to provide the transferred second data feed simultaneously multiplexed with the transferred first data feed to the display.

9. The apparatus of claim 8 wherein a plurality of communications protocols are stored in the memory and wherein the computer executable instructions stored in the memory and executable by the processor comprise:

instructions to determine via the interface a communications protocol of a cellular device configured to communicate with a cellular network; and instructions to establish communication between the processor and the cellular device via the interface when one of plurality of communications protocols corresponds to a communications protocol of the cellular device.

10. The apparatus of claim 8 wherein the first and second data feeds each includes a plurality of entries, and the computer executable instructions instruct the processor to provide the transferred first data feed to an upper area of the display, and the transferred second data feed to a lower area of the display, such that a set number of entries for each of the transferred first and second data feeds is displayed in a list in the respective areas of the display, and further to remove an existing entry in the list and add a new entry to the bottom of the list when the first and second data feeds are updated.

11. The apparatus of claim 1:

wherein the device interface is configured to connect with a first cellular device which is configured to connect with a cellular network;

wherein the transferred data feed provided by the processor to the display comprises a transferred first data feed from a first application executed by the first cellular device;

wherein the device interface transfers a second data feed, from a second application executed by a second cellular device and received via the cellular network, to the processor;

wherein the display is responsive to the processor for displaying the transferred second data feed, wherein the memory instructs the processor to receive the transferred second data feed via the device interface and instructs the processor to provide the transferred second data feed to the display, and wherein the processor multiplexes the first and second data feeds.

12. The apparatus of claim 11 wherein a plurality of communications protocols are stored in the memory and wherein the computer executable instructions stored in the memory and executable by the processor comprise:

instructions to determine via the interface a communications protocol of at least one of the first cellular device and the second cellular device configured to connect with the cellular network; and instructions to establish communication between the processor and the at least one of the first cellular device and the second cellular device via the interface when one of the plurality of communications protocols corresponds to the communications protocol of the at least one of the first cellular device and the second cellular device.

13. The apparatus of claim 1 wherein the computer executable instructions further instruct the processor to transform the transferred data feed to be compatible with a data transfer protocol of the processor.

14. The apparatus of claim 1 wherein the computer executable instructions instruct the processor to provide the transferred data feed to the display in a tickertape type presentation.

15. A method comprising:

determining a compatible communications protocol between an external device and an accessory separate from the external device;

establishing a connection between the external device and the accessory via the determined protocol;

receiving from the external device at the accessory a data feed received from a network by an application executed by the external device;

presenting the received data feed on a display of the accessory;

receiving at the accessory user input responsive to the data feed presented on the display;

generating association data associating the received user input with at least a portion of the transferred data feed;

transferring the received user input and the association data from the accessory to the application executed by the external device, whereby the external device updates the data feed in response to the transferred user input and to the association data; and receiving from the external device the updated data feed;

wherein the data feed includes a data stream that is a sequence of digitally encoded coherent signals.

16. The method of claim 15 wherein the received data feed comprises a received first data feed and further comprising:

determining a second compatible communications protocol between a second external device and the accessory;

establishing a connection between the second external device and the accessory via the determined second protocol;

receiving from the second external device at the accessory a second data feed received from a network by a second application executed by the second external device;

presenting the received second data feed multiplexed with the first transferred data feed on the display;

receiving a second user input responsive to the second data feed presented on the display; and transferring the received second user input from the accessory to the second application executed by the second external device.

17. The method of claim 15 wherein the received data feed comprises a received first data feed and further comprising:

receiving from the external device at the accessory a second data feed received from a network by a second application executed by the external device;

presenting the received second data feed multiplexed with the received first data feed on the display;

receiving a second user input responsive to the second data feed presented on the display; and transferring the received second user input from the accessory to the second application executed by the external device.

18. A system comprising:

a cellular device executing an application receiving a data feed via a cellular network, said cellular device having a cell processor and an I/O port connected to the cell processor; and a docking station comprising a unitary enclosure including the following integral components within the unitary enclosure:
  a processor;
  a device interface connected to the processor, said device interface for connecting the processor with the cellular device and for transferring the data feed from the cellular device to the processor;
  a display connected to the processor and responsive to the processor for displaying the transferred data feed;
  a memory connected to the processor and storing computer executable instructions for instructing the processor to receive the transferred data feed via the device interface and for instructing the processor to provide the transferred data feed to the display, said processor configured to execute the instructions; and
  a user interface connected to the processor for providing user input to the processor;
  wherein the data feed includes a data stream that is a sequence of digitally encoded coherent signals; and
  wherein the computer executable instructions further instruct the processor to receive the user input, to generate association data associating the received user input with at least a portion of the transferred data feed, to transfer the user input and the association data to the cellular device via the device interface, whereby the cellular device updates the data feed in response to the transferred user input and to the association data, and to receive the updated data feed.

19. The system of claim 18 wherein a plurality of communications protocols are stored in the memory and wherein the computer executable instructions stored in the memory and executable by the processor comprise:
  instructions to determine via the interface a communications protocol of the cellular device; and
  instructions to establish communication between the processor and the cellular device via the interface when one of plurality of communications protocols corresponds to a communications protocol of the cellular device.

20. The system of claim 18 wherein the computer executable instructions stored in the memory and executable by the processor comprise:
  instructions to establish communication via the interface between the processor and the cellular device;
  instructions to transfer a user selected data feed from the cellular device to the processor;
  instructions to buffer and format the transferred data feed; and
  instructions to display on the display the buffered and formatted data feed.

21. The system of claim 18:
  wherein the transferred data feed provided by the processor to the display comprises a transferred first data feed;
  wherein the device interface transfers a second data feed from a second application executed by the cellular device and received via a cellular network to the processor, said display responsive to the processor for displaying the transferred second data feed; and
  wherein the memory instructs the processor to receive the transferred second data feed via the device interface and instructs the processor to provide the transferred second data feed simultaneously multiplexed with the transferred first data feed to the display.

22. The system of claim 18:
  wherein the transferred data feed provided by the processor to the display comprises a transferred first data feed;
  wherein the device interface transfers to the processor a second data feed from a second application executed by a second cellular device and received via a cellular network; and
  wherein the display is responsive to the processor for displaying the transferred second data feed, wherein the memory instructs the processor to receive the transferred second data feed via the device interface and instructs the processor to provide the transferred second data feed to the display, and wherein the processor multiplexes the transferred first and second data feeds.

* * * * *